United States Patent
Jianzhong et al.

(10) Patent No.: US 7,877,441 B2
(45) Date of Patent: Jan. 25, 2011

(54) SYSTEM AND METHOD FOR DELIVERING FUNCTION/DATA BY DECOMPOSING INTO TASK ORIENTED ANALYTICAL COMPONENTS

(75) Inventors: Qian Jianzhong, Princeton Junction, NJ (US); Guo-Qing Wei, Plainsboro, NJ (US); Feng Ma, Pennington, NJ (US); Li Fan, Belle Mead, NJ (US); Xiaolan Zeng, Princeton, NJ (US); Cheng-Chung Liang, West Windsor, NJ (US)

(73) Assignee: EDDA Technology, Inc., Princeton Junction, NJ (US)

( * ) Notice: Subject to any disclaimer, the term of this patent is extended or adjusted under 35 U.S.C. 154(b) by 588 days.

(21) Appl. No.: 11/896,732

(22) Filed: Sep. 5, 2007

(65) Prior Publication Data

US 2008/0086526 A1  Apr. 10, 2008

Related U.S. Application Data

(60) Provisional application No. 60/842,164, filed on Sep. 5, 2006.

(51) Int. Cl.
*G06F 15/16* (2006.01)
(52) U.S. Cl. .................. 709/203; 709/217; 709/219
(58) Field of Classification Search ............... 709/203, 709/217, 219
See application file for complete search history.

(56) References Cited

U.S. PATENT DOCUMENTS

| 6,314,565 | B1 * | 11/2001 | Kenner et al. ............. 717/171 |
| 6,523,166 | B1 | 2/2003 | Mishra et al. |
| 2001/0034736 | A1 | 10/2001 | Eylon et al. |
| 2003/0217196 | A1 | 11/2003 | Chan et al. |

FOREIGN PATENT DOCUMENTS

WO  WO 2006/047133 A2  5/2006

OTHER PUBLICATIONS

International Preliminary Report on Patentability and Written Opinion of the international Searching Authority issued in International Application No. PCT/US2007/019302, dated May 21, 2008.

* cited by examiner

*Primary Examiner*—George C Neurauter, Jr.
(74) *Attorney, Agent, or Firm*—McDermott WIll & Emery LLP

(57) ABSTRACT

A method and system is provided for processing function on demand operation. A user interface at a user site is initiated. A selection of a processing function associated with an application is received via the user interface. A processing function on-demand (PFOD) request is transmitted via a network connection to request the selected processing function. As a response to the PFOD request, a processing function on-demand (PFOD) delivery including the selected processing function is sent. When the PFOD delivery is received, the selected processing function is utilized at the user site.

33 Claims, 9 Drawing Sheets

SYSTEM AND METHOD FOR DELIVERING FUNCTION/DATA BY DECOMPOSING INTO TASK ORIENTED ANALYTICAL COMPONENTS

PRIORITY INFORMATION

This application claims priority under 35 U.S.C. §119 from Provisional Patent Application No. 60/842,164, filed on Sep. 5, 2006. The entire subject matter of the application is incorporated herein by reference.

BACKGROUND

1. Technical Field

The present teaching relates generally to information processing. Specifically, the present teaching relates to method and system for providing information processing service.

2. Discussion of Related Art

In modern society, information processing is ubiquitous. Information processing systems are generally referred to as applications. For example, medical diagnostic imaging applications may be used to perform diagnostic analysis of, e.g., abnormalities and such analysis may be performed based on different types of information such as data obtained by examining different aspects of patients such as bodies, organs, tissues, or genotype information. Some clinical application tasks are object-oriented or dedicated with often different levels of complexities. This is so even when used for a specific target to be analyzed.

Conventional information processing systems are usually required either to be installed locally on a computer or to be downloaded from a remote site and then installed on a computer. Such installation, locally or remotely, requires an entire system or application to reside on the computer on which the application runs. Once the entire system resides on a computer, a user who desires to utilize part of the application or system to accomplish a specific task, e.g., diagnostic analysis, may invoke corresponding function(s) of the locally installed application to complete the task(s). In addition, information to be analyzed by the information processing system is usually provided to the computer where the entire information processing application resides.

For example, in medical information processing, to utilize a medical information processing application to analyze medical data such as images, a user may utilize different functionalities of the medical information processing application. To do so, the user may have two alternatives. First, the user may install the entire application or system in a local computer. In today's commercial world, this requires the user to purchase a license for the entire application software even though there may be many functions in the same application software that the user may never need. In addition to the cost of paying for unwanted functionality, there are situations in which expensive hardware configurations/upgrades may also be required in order to support an execution environment that a complete information processing system needs. This drives the cost even higher and, hence, makes such information processing systems less affordable to users. Furthermore, when a user purchases an information processing system, it is usually the user's responsibility to maintain the system, which can be very costly and sometimes difficult. On top of that, when a new version of an information processing system is released, more expense is incurred if an upgrade is needed. A substantial portion of the cost may be unnecessary particularly when a user uses only a portion of all functions associated with an information processing application.

One alternative to individual purchase of an information processing application is to share an information processing application residing, e.g., on a server. Whenever a user needs to invoke a particular function of the application, the user also needs to send the data to be analyzed to the server. For example, in medical imaging, the image or data associated therewith are sent to the server for processing and analysis. When the volume of data to be analyzed is high, e.g., images, this makes the entire process very time-consuming. In addition, this may increase the traffic on the network, causing congestion. Furthermore, in some applications especially medical imaging or clinical applications, this is simply not a practical solution.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

DETAILED DESCRIPTION

The present teaching is for processing function on-demand operations. A user who is in need of a processing function of a particular application can make a processing function on-demand request and receive the on-demand processing function from a provider so that the processing function may be deployed in the user's environment and activated to perform information processing without having the entire application system associated therewith to be deployed on the user's computer. In one embodiment, the present teaching discloses a system and method for an open, software-as-service-ondemand system for medical image processing and analysis. The disclosed system delivers medical image processing and analysis processing functions as services on demand to remote users over network connections, e.g., the internet/intranet, without having to deploy the entire system on users' sites or transfer medical images from the remote user to the service provider.

Figure 1:
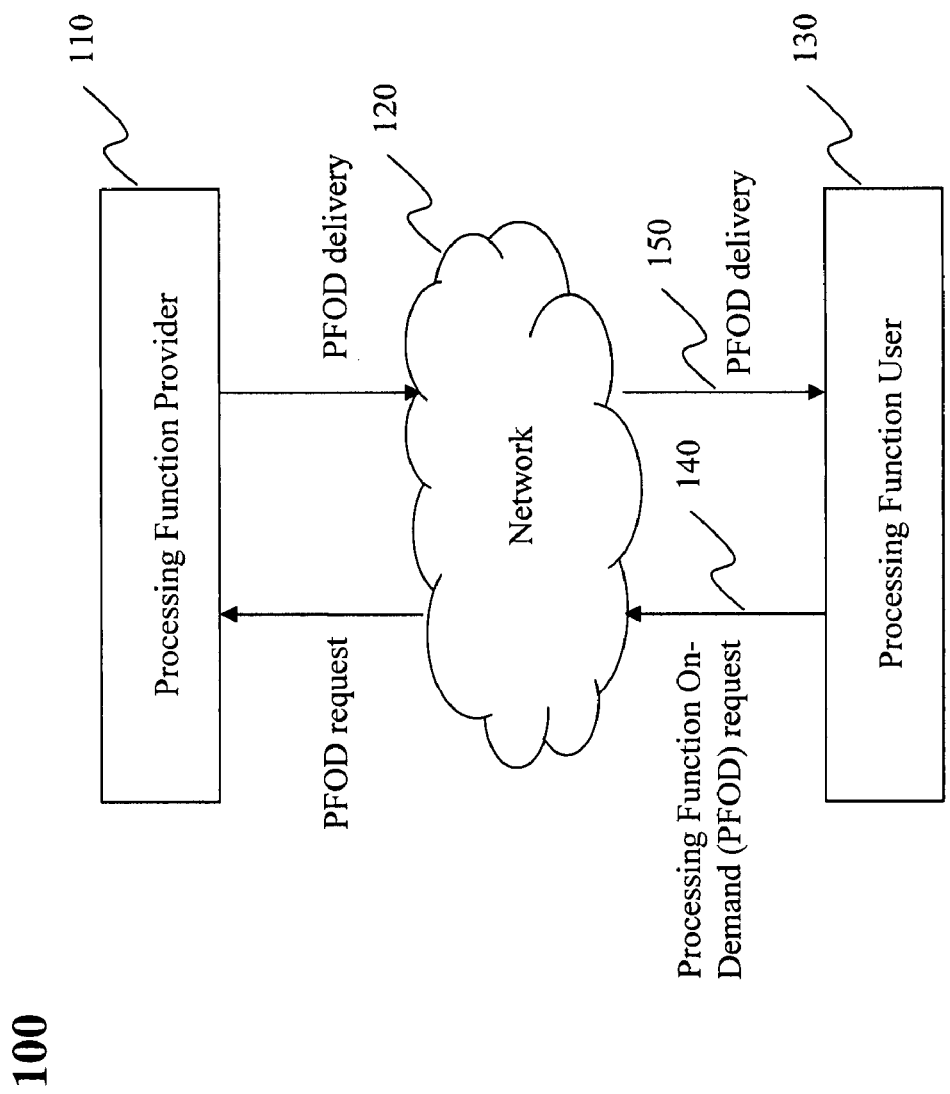
FIG. 1 depicts a block diagram of an exemplary embodiment for a processing function on demand, according to an embodiment of the present teaching.

FIG. 1 depicts a block diagram of an exemplary system 100 for a processing function on demand, according to an embodiment of the present teaching. The exemplary processing function on-demand system 100 comprises a processing function (PF) provider 110 and a processing function (PF) user 130, where the PF provider 110 and the PF user 130 are connected via a network 120. In operation, the PF user 130 sends a processing function on-demand (PFOD) request 140, via the network 120, to the PF provider 110. Upon receiving the PFOD request 140, the PF provider 110 packages a PFOD delivery 150 based on the PFOD request 140 and sends the PFOD delivery 150, e.g., via the network 120, to the PF user 130.

The network 120 may correspond to the Internet, an intranet, a wireless network, a virtual network, a public telephone switched network (PTSN), a proprietary network, or any combination thereof. In FIG. 1, the network 120 may represent one or more networks. In some embodiments, the PFOD delivery 150 may be sent via the same network that delivers the PFOD request 140. In some embodiments, the PFOD request and the PFOD delivery may be sent via different networks (not shown). For example, a PFOD request may be sent via a low bandwidth network due to, e.g., that the request is text in nature and requires very little bandwidth. A PFOD delivery may be of large in size when delivered all at once. In this case, the PFOD delivery may be sent via a network of a higher bandwidth in order to, e.g., ensure fast delivery. In some embodiments, the PFOD delivery may be made in a streaming manner and the content contained in the PFOD delivery may be delivered in an order that is consistent with the logic of the processing function(s) contained in the PFOD delivery. The order of streaming the PFOD delivery may also be dynamically determined based on real time demand. For example, a first part of the PFOD delivery may be first streamed to the PF user 130 and is utilized upon arrival. Depending on the situation in utilizing the first part of the PFOD delivery, an additional part (second) of the PFOD delivery may be streamed to the PF user on a demand basis.

Figure 2:
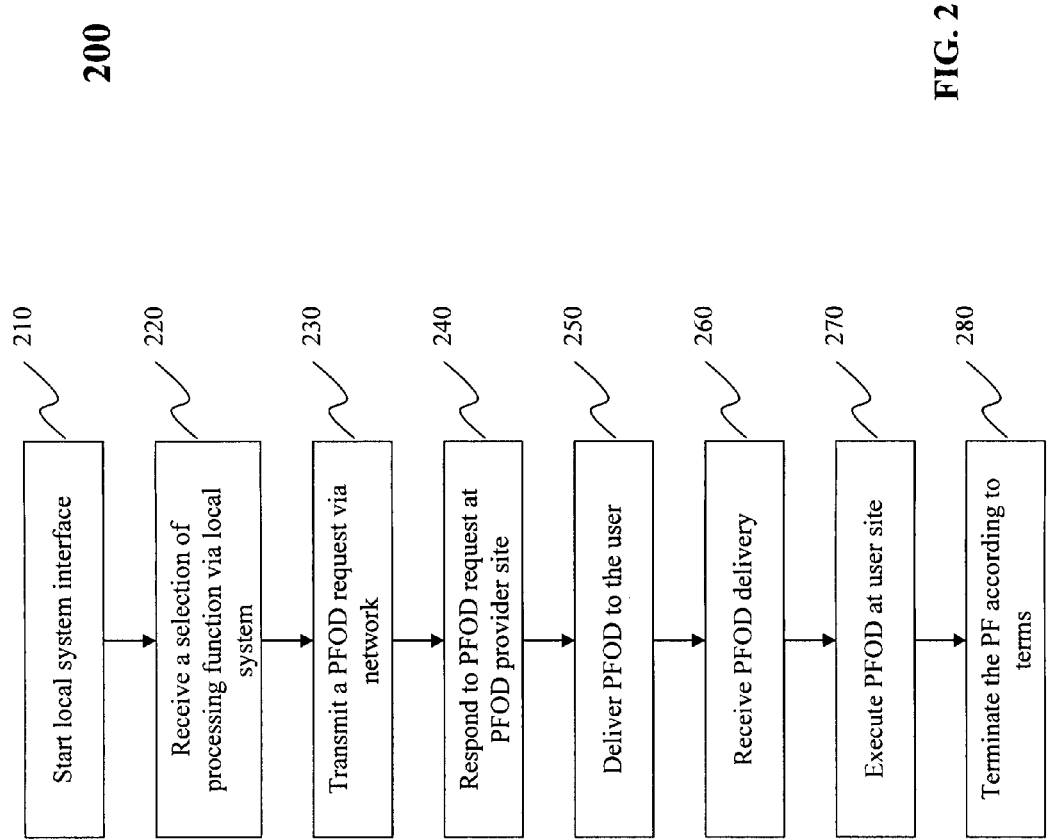
FIG. 2 is a flowchart of an exemplary process in which a processing function is utilized in an on-demand manner, according to an embodiment of the present teaching.

FIG. 2 is a flowchart of an exemplary process in which a processing function is utilized in an on-demand manner, according to an embodiment of the present teaching. A local system interface is first initiated, at 210, at the processing function (PF) user site. When a selection of a processing function is received, at 220, via the system interface, the local system at the PF user site transmits, at 230, a PFOD request (140) to a PF provider (e.g., 110) via a network connection (e.g., 120). Upon receiving the PFOD request, the PF provider responds, at 240, to the PFOD request and delivers, at 250, the requested PFOD to the user that makes the request. When the PF user receives, at 260, the PFOD delivery, the PF user utilizes (e.g., executes), at 270, the delivered processing function (PF) at the user site. After the use of the delivered processing function, the PF user terminates, at 280, the processing function in accordance with some predetermined terms. For example, the PF user 130 and the PF provider 110 may have agreed upon some contractual terms that govern the operational scope and life of each delivered PF.

Figure 3:
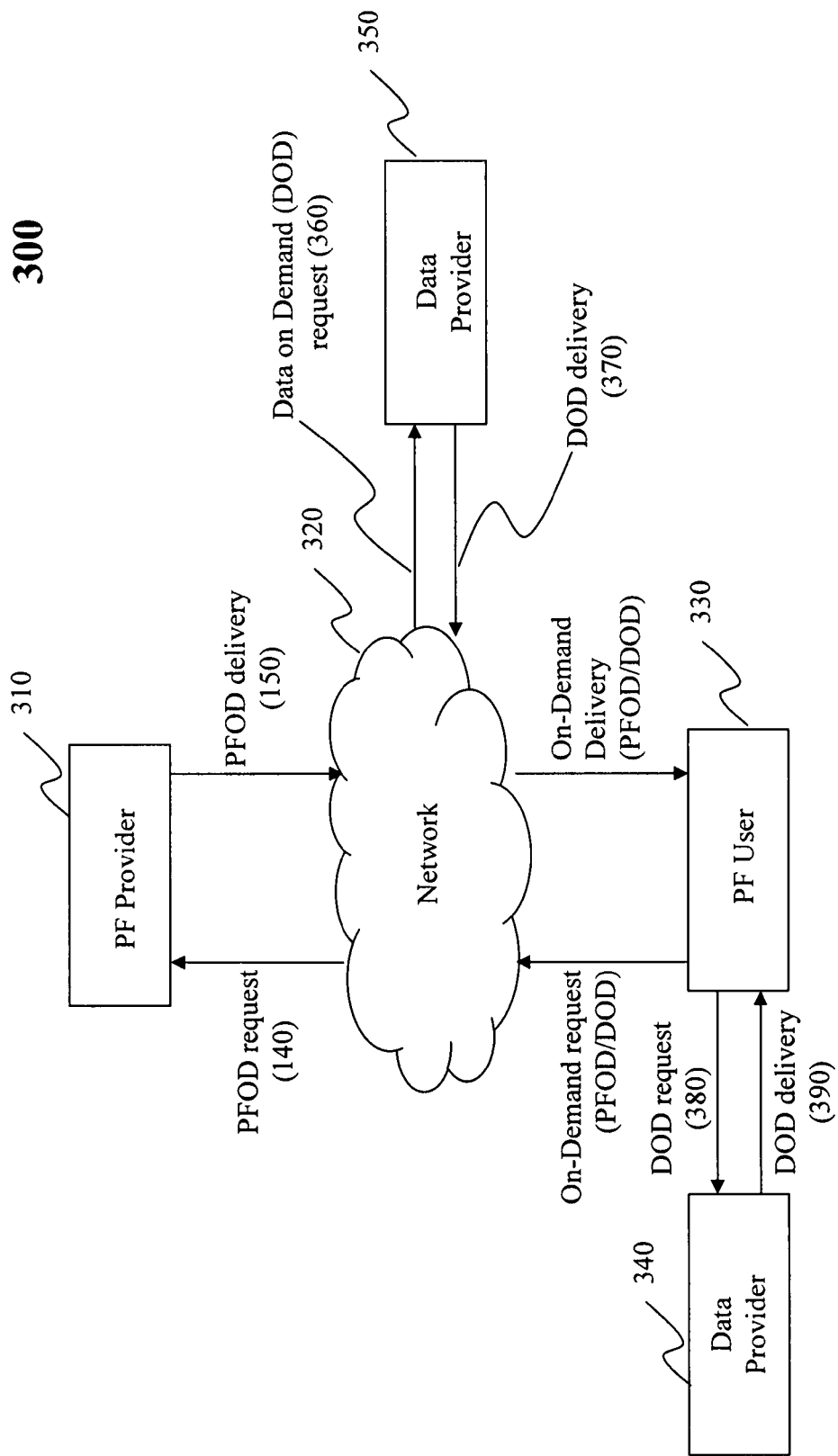
FIG. 3 depicts a block diagram of a different exemplary embodiment for a processing function on demand, according to an embodiment of the present teaching.

FIG. 3 depicts a block diagram of a different exemplary system 300 for a processing function/data on demand, according to an embodiment of the present teaching. The exemplary processing function on-demand system 300 comprises a processing function (PF) provider 310, a processing function (PF) user 330, and either a local data provider 340 or a remote data provider 350, where the PF provider 310, the PF user 330, and the remote data provider 350 are connected via one or more networks 320. In operation, to process data, the PF user 330 may request both data and processing functions. For example, the PF user 330 may send an on-demand (OD) request, which may include a PFOD request 140 for some processing function or a data on-demand (DOD) request 360 for data to be delivered remotely, via the network 320. The PF user 330 may alternatively send an OD request containing only a PFOD request for a remote delivery processing function and a local DOD request 380 to its local data provider 340 for locally retrievable data to be processed. In other embodiments, the PF user 330 may request both data from a remote data provider 350 and data from a local data provider 340.

The PF user 330 may make a determination of where to access data and processing functions based on its need. The PF user 330 may also make such a determination based on the bandwidth required to receive the requested information. For example, if the data to be processed is not available locally and the volume of the requested data is permissible according to the available bandwidth, the PF user 330 may proceed to request data from a remote data provider 350. In medical information processing systems, for instance, data relating to patience demographic information may be downloaded from a remote data provider because such data may be more likely to be located at a site that is different from the site where other types of data, e.g., CT scans or MRI images, are acquired. In this manner, a PF user such as a medical facility where CT scans or MRI images of a patient are acquired may be able to access both the image data from a local data provider and data associated with the underlying patient (e.g., a blood test result) from a remote data provider in order to analyze data from different sources for certain purposes, e.g., medical diagnosis.

The PFOD request and DOD request included in the OD request may be dispatched to the PF provider 310 or the remote data provider 350, respectively. Upon receiving the PFOD request 140, the PF provider 310 packages a PFOD delivery 150 based on the PFOD request 140 and sends the PFOD delivery 150, e.g., via the network 320, to the PF user 330. Similarly, upon receiving the DOD request 360, the data provider 350 retrieves the requested data and sends a DOD delivery 370 to the PF user that makes the request. In some embodiments, the delivery, either the PFOD delivery 150 or DOD delivery 370, may be sent via the same network that delivers the request. In some embodiments, a different network (not shown) may be utilized to make the deliveries.

Similarly to what is described in FIG. 2, the deliveries (PFs or data) between a provider (e.g., PF provider 310 or data provider 350) and a requester (e.g., the PF user 330) may be governed by certain agreed terms. For instance, the delivered PFs may be disabled after some agreed period or number of usages. The disablement may be performed by the PF itself as a self-destruct operation or by a monitoring mechanism running on the PF user site. Data delivered from a service data provider may be managed in a similar or a different manner. For instance, data delivered from the data provider 350 may be governed by some contractual terms. In some embodiments, the data acquired from a local data provider (340) may be managed differently and the data from a local data provider may be freely accessible to the PF user.

Figure 4:
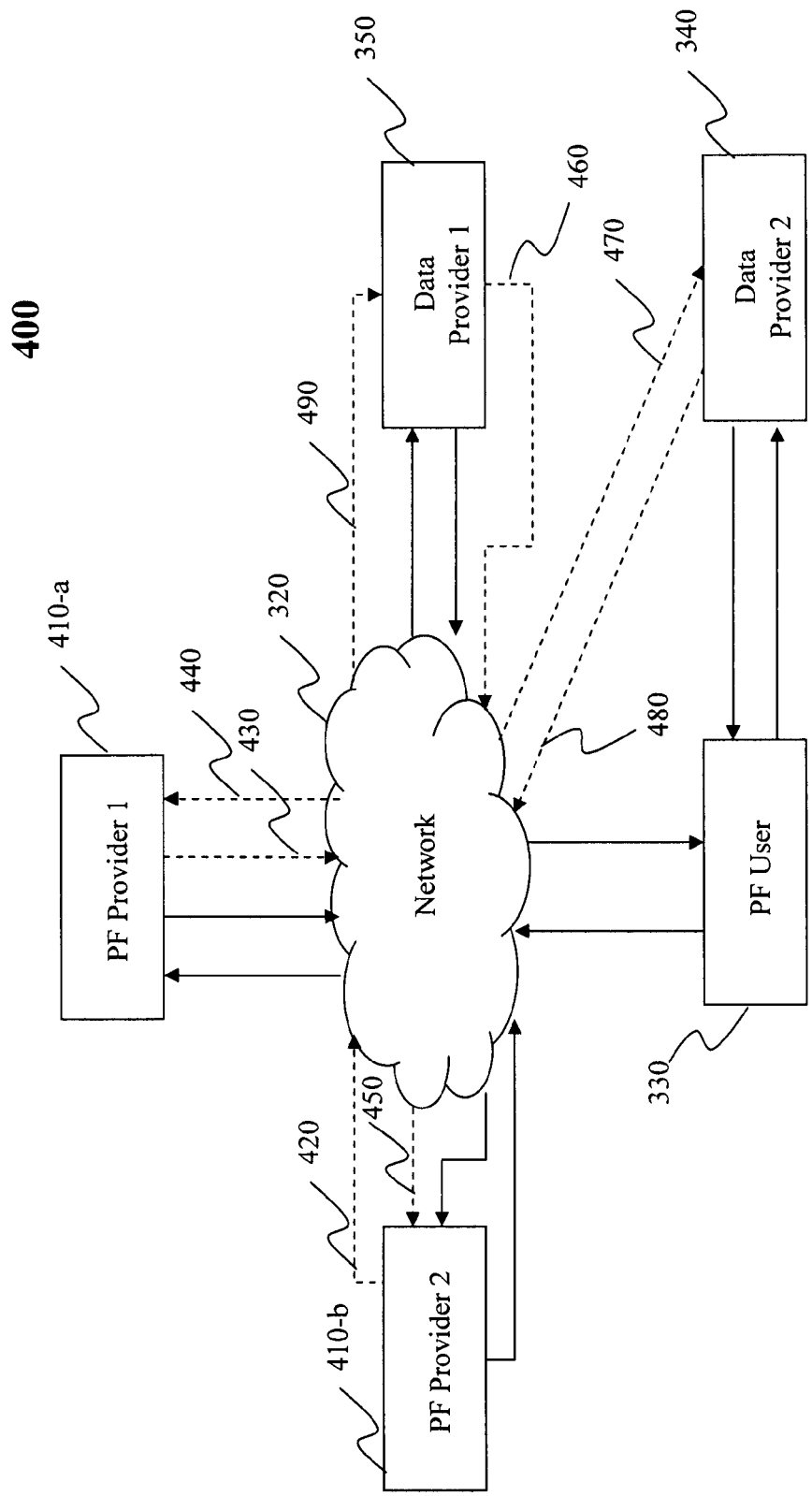
FIG. 4 depicts a block diagram of another different exemplary embodiment for a processing function on demand, according to an embodiment of the present teaching.

FIG. 4 depicts a block diagram of yet another exemplary system 400 for processing function/data on demand, according to an embodiment of the present teaching. In the exemplary system 400, different PF providers connected via a network may communicate with each other to request, receive, and dispatch PFs (e.g., as loans or rentals) in order to respond to a request for such PFs. Similarly, different data providers connected via a network may communicate with each other to request, receive, and dispatch data to be processed in respond to a request for such data. In FIG. 4, there comprises two or more (not shown) PF providers, PF provider 1 410-*a* and PF provider 2 410-*b*. When the PF user 330 makes a PFOD request to, e.g., PF provider 1 410-*a*, if the PF provider 1 410-*a* does not have the requested PFs in stock, the PF provider 1 410-*a* may, in this embodiment, make a PFOD request 430 to the PF provider 2 410-*b* via the network 320. Upon receiving the PFOD request from the PF provider 1 410-*a* via the dotted connection 450, the PF provider 2 410-*b* may supply the requested PF via connection 420 and deliver it to the PF provider 1 410-*a* via the network 320. Upon receiving the PF from the PF provider 2, the PF provider 1 410-*a* may then deliver the received PF to the PF user 330 in response to the PFOD request from the user 330.

Similarly, When the PF user 330 makes a PFOD request to, e.g., PF provider 2 410-*b*, if the PF provider 2 410-*b* does not have the requested PF(s) in stock, the PF provider 2 410-*b* may, in this embodiment, make a PFOD request 420 to the PF provider 1 410-*a* via the network 320. Upon receiving the PFOD request from the PF provider 2 410-*b* via the dotted connection 440, the PF provider 1 410-*a* may supply the requested PF via connection 430 and deliver the requested PF to the PF provider 2 410-*b* via the network 320. Upon receiving the PF from the PF provider 1, the PF provider 2 410-*b* may then deliver the received PF to the PF user 330 in response to the PFOD request from the user 330.

Data may be requested and shared among data providers in a similar fashion. In operation, such sharing may be governed by some contractual terms or certain arrangements as to business relationships. In those arrangements, the providers, either for processing functions or data, form an inter-provider loan network in order to respond to a request from a user. The financial terms associated with such loans may be separate from the service agreement between a provider and a user. Whenever such a loan situation arises, there may be certain accounting associated therewith. In some embodiments, the PF providers may provide services for a fee. In some embodiments, a PF provider may be a peer that provides a requested PF without charging a fee.

Figure 5:
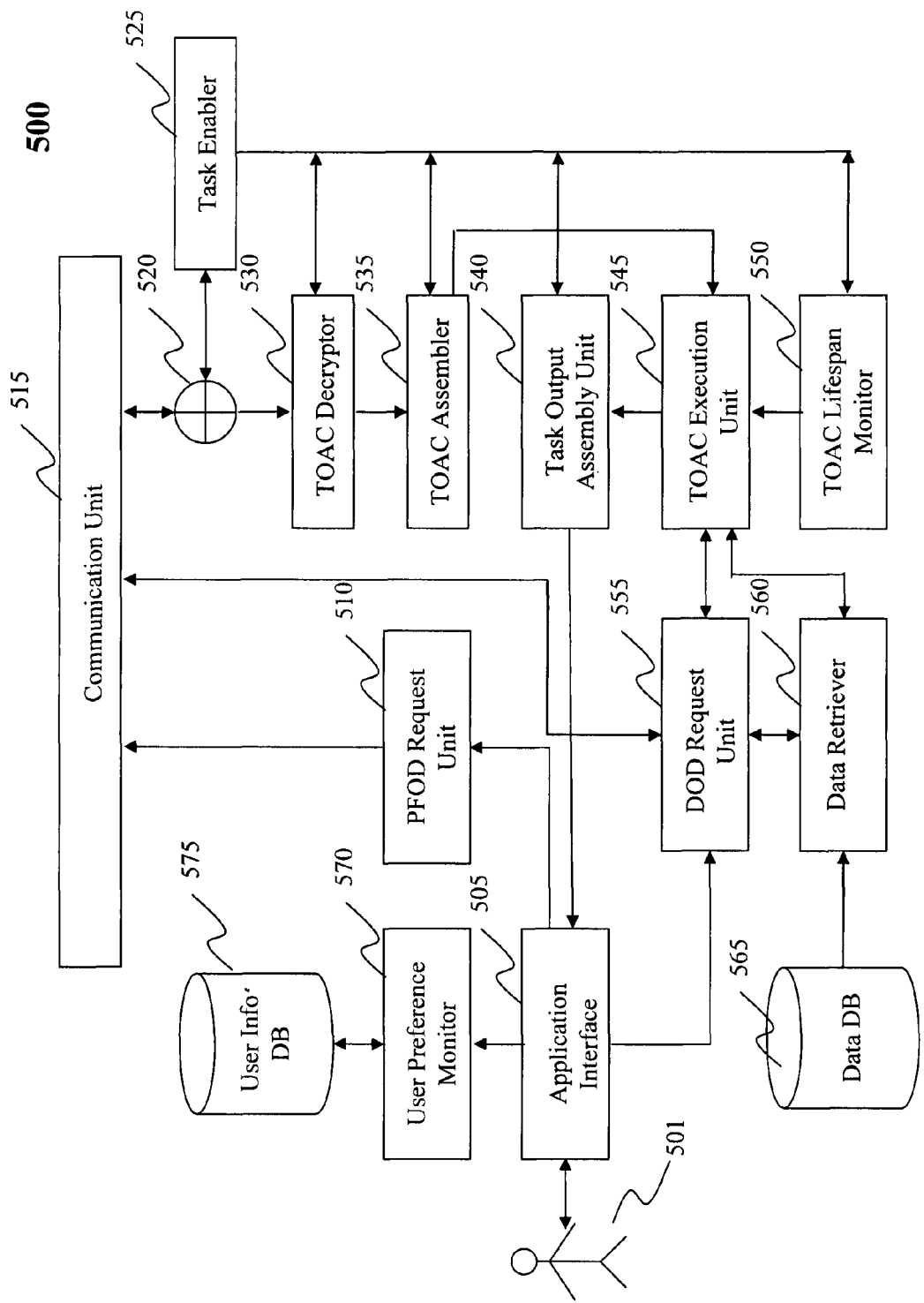
FIG. 5 depicts a block diagram of an exemplary user site configured to support a processing function on demand operation, according to an embodiment of the present teaching.

FIG. 5 depicts a block diagram of an exemplary PF user 500 configured to facilitate processing function on demand (PFOD) operations, according to an embodiment of the present teaching. The PF user system 500 may be configured as a client sub-system. In some embodiments, the PF user 500 comprises a light weight basic system framework corresponding to some application(s). In this exemplary embodiment, the PF user 500 comprises an application interface 505, a PFOD request unit 510, a communication unit 515, a task enabler 525, a task oriented analytic component (TOAC) decryptor 530, a TOAC execution unit 545, and a DOD request unit 555. The application interface 505 may present to a user 501 a group of processing functions that can be utilized to analyze data. The application interface 505 may be implemented as a client GUI that handles, e.g., user interaction in the client system. The application interface 505 may facilitate a user to load, display, and analyze data by presenting different functionally selectable interface components. For example, a user may click on a pull down menu to load data via different options. As another example, a user may be able to select one of multiple processing functions such as image analysis to be applied to some data that are already loaded.

The user 501 may be a physician and the underlying application may correspond to a system capable of analyzing MRI volumetric data. The application interface 505 may be configured to provide a list of functional tools to a physician (user) that can be used to process patients' MRI data. Part of the patient data may be from a local MRI scan machine connected to the PF user system and part of the patient data may be from a remote location such as a patient's primary doctor's office.

Upon being presented with choices of analysis tools, the user 501 may make a selection of a specific processing function (e.g., automatically detecting an abnormal nodule present in the MRI scan) to be used to analyze data. Upon receiving the user's selection of a PF, the application interface may forward the selection to the PFOD request unit 510, which may then generate a PFOD request to obtain an, e.g., executable processing function from a PF provider. Alternatively, the PFOD request unit 510 may also check first to see whether the requested PF is present in the user's system (not shown) and determine whether a PFOD request is to be sent or not. When it is determined to send out a PFOD request based on the user's selection, the PFOD request unit 510 may transmit the request via the communication unit 515.

The application interface 505 may also activate the DOD request unit 555 to locate data to be processed. The DOD request unit 555 may determine whether the data are to be retrieved locally or requested remotely. If the data are local, the DOD request unit 555 may activate a data retriever 560 to retrieve data from a local database 565. If the data specified by the user to be processed include data that are not available locally, the DOD request unit 555 may also send a data request via the communication unit.

Once a PFOD request is transmitted, the communication unit 515 may be responsible for receiving a response or PFOD delivery. Upon receiving the delivery, the communication unit 515 forwards the received information to corresponding parts of the system. For example, the received information may be forwarded to a separator 520 that demultiplexes the received information into corresponding functional parts. For example, in some embodiments, the received PFOD delivery includes a task enabling part and a TOAC part which may comprise the requested PFs and other associated functions. The task enabling part may be forwarded to a task enabler 525 and the TOAC part may be forwarded to a TOAC decryptor to decode the received TOAC or TOAC group.

The task enabling part may be a part that may be first deployed from a PF provider to a PF user in response to a PFOD request. After arriving at the PF user site, the task enabler 525 is used to enable certain components in the PF user system, schedule the execution order of different functions included in the TOACs or TOAC groups, and coordinate with these components in the PF user system, e.g., to monitor and control the execution of the requested image analysis task.

The TOAC decryptor 530 may decrypt TOACs on the fly upon receipt of encrypted TOACs via network. The decrypted TOACs may be fed to the TOAC assembler 535. The TOAC assembler 535 may be used to check various states of TOACs, including arrival status, the status of grouping policies and the status of corresponding actions. For example, the TOAC assembler 535 may check the status of each TOAC upon arrival. If any of the TOACs is missing, the TOAC assembler 535 may notify the task enabler 525, which may subsequently request the corresponding PF provider to resend missing TOAC. The TOAC assembler 535 may also group certain TOACs in order to organize these TOACs to form a unit that is capable of achieve a certain sub-task. In addition, the TOAC assembler 535 may notify the TOAC execution unit 545 when the assembly of TOACs or TOAC groups is complete. One requested processing function, e.g., an image analysis task, may comprise more than one assembled TOAC or TOAC group. A single task enabler may be capable of enabling multiple TOAC assembler units.

The TOAC execution unit 545 may be used to execute the assembled TOACs or TOAC groups. The TOAC execution unit 545 may communicate with the task enabler 525 for execution related details such as the order and status of TOACs and TOAC groups. The inputs to the TOAC execution unit 545 may be data retrieved from the local database 565, data received from a remote data provider via the DOD request unit 555, or outputs generated by other TOACs. The output of the TOAC execution unit may be fed into a task output assembly unit 540. A single task enabler may be capable of enabling more than one TOAC execution unit (not shown).

TOACs' life span may be monitored and controlled by the TOAC life span monitor 550, which may coordinate with task enabler 525 to govern the life span of each TOAC or TOAC group. In some embodiments, a TOAC may perform self-destruct when the TOAC is so constructed. The self-destruct may be activated based on some predetermined conditions. For instance, a predetermined condition may be the life span measured based on some set initial or starting time. Self-destruct may also be triggered by some other predetermined conditions, e.g., a copying operation is detected. In some embodiments, it is the TOAC life span monitor 550 that is designated to destroy a TOAC in accordance with the terms agreed on or event(s) observed.

When more than one TOAC execution unit is required, the task output assembly unit 540 may be configured to intelligently fuse outputs from different TOAC execution units and derive a final output/result of the requested data analysis service. The output/result from the task output assembly unit 540 may then be forwarded to the application interface 505, where such result may be organized and displayed to the user 501.

In some embodiments, the PF user system 500 may also optionally include a user preference monitor 570 and a user information database 575. The user preference monitor 570 may be designed to observe users' preferences or habits in deploying processing functions and such observations may be analyzed and utilized in determining how a PFOD request is to be made whenever a user makes a particular selection. For example, different users may have different preferences in terms of how to perform data analysis or how to approach, e.g., medical diagnosis. For instance, to diagnose a brain tumor, Doctor A may prefer to detect the presence of the tumor first using MRI analysis and then determine the precise 3D pose of the tumor using analysis based on CT scan data. A different doctor, Doctor B, may prefer to detect the presence of the tumor using analysis of CAT scan data and then measure the size and position of the tumor by combining the MRI and CT analysis. Such preferences are summarized based on doctors' past behavior observed using the user preference monitor 570. Such observed preferences may be recorded in the users' information database and used to determine automatically what processing functions to be requested from one or more PF providers in order to assist different doctors in achieving diagnosis of a brain tumor using different preferred processing functions. If Doctor A makes a selection of "Detecting a brain tumor" on the application interface 505, such a selection is sent to the user preference monitor 570 which may then retrieve the observed past preference information from the database 575. Using the retrieved past preference information, the user preference monitor 570 may send the retrieved preference information with respect to Doctor A to the PFOD request unit, which may then determine, based on both Doctor A's selection and his preference to determine which processing functions are to be requested over the network.

The PF user system 500 may have an open interface which may permit new plug-ins representing processing components from different vendors which can be delivered to different PF user systems from different PF providers.

Figure 6:
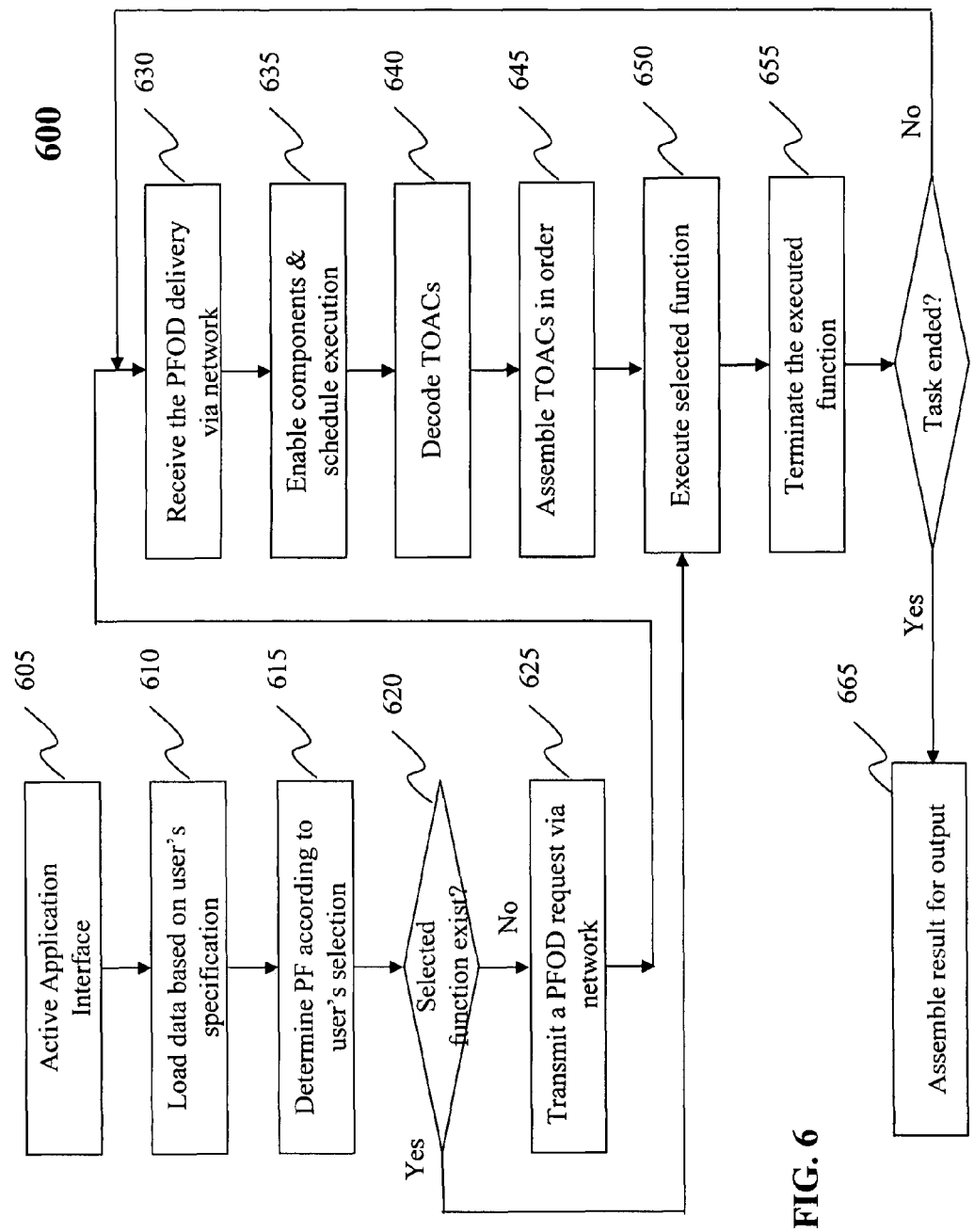
FIG. 6 is a flowchart of an exemplary process for a processing function on demand operation on a user site, according to an embodiment of the present teaching.

FIG. 6 is a flowchart of an exemplary process for processing function on demand operation in a user system, according to an embodiment of the present teaching. The application interface is first activated at 605. Data needed for analysis may be loaded at 610 based on a user's specification. The loading may include making a DOD request, either locally or remotely, receiving the requested data, and storing the data for further analysis. At 615, the processing function(s) needed to perform the user's selected task(s) are determined. If any of the processing functions does not exist at the PF user's system, determined at 620, the PF user's system transmits, at 625, a PFOD request via a network to a PF provider.

When the PF user system receives, at 630, the PFOD delivery via network connection from the PF provider, the PF user system may then use the received task enabler to enable, at 635, the functional components and schedule their respective executions. In addition, the PF user system decodes the received TOACs or TOAC groups at 640. Based on information from the task enabler, the PF user system assembles, at 645, the TOACs in their respective orders prior to executing the selected functions at 650. Upon utilizing the on-demand functions/tasks, the PF user system terminates the executed functions/tasks at 655 based on the agreed terms with respect to the executed functions. When all tasks associated with the on-demand processing function are completed, determined at 660, the processing results produced by the processing function(s) are assembled at 665.

Figure 7:
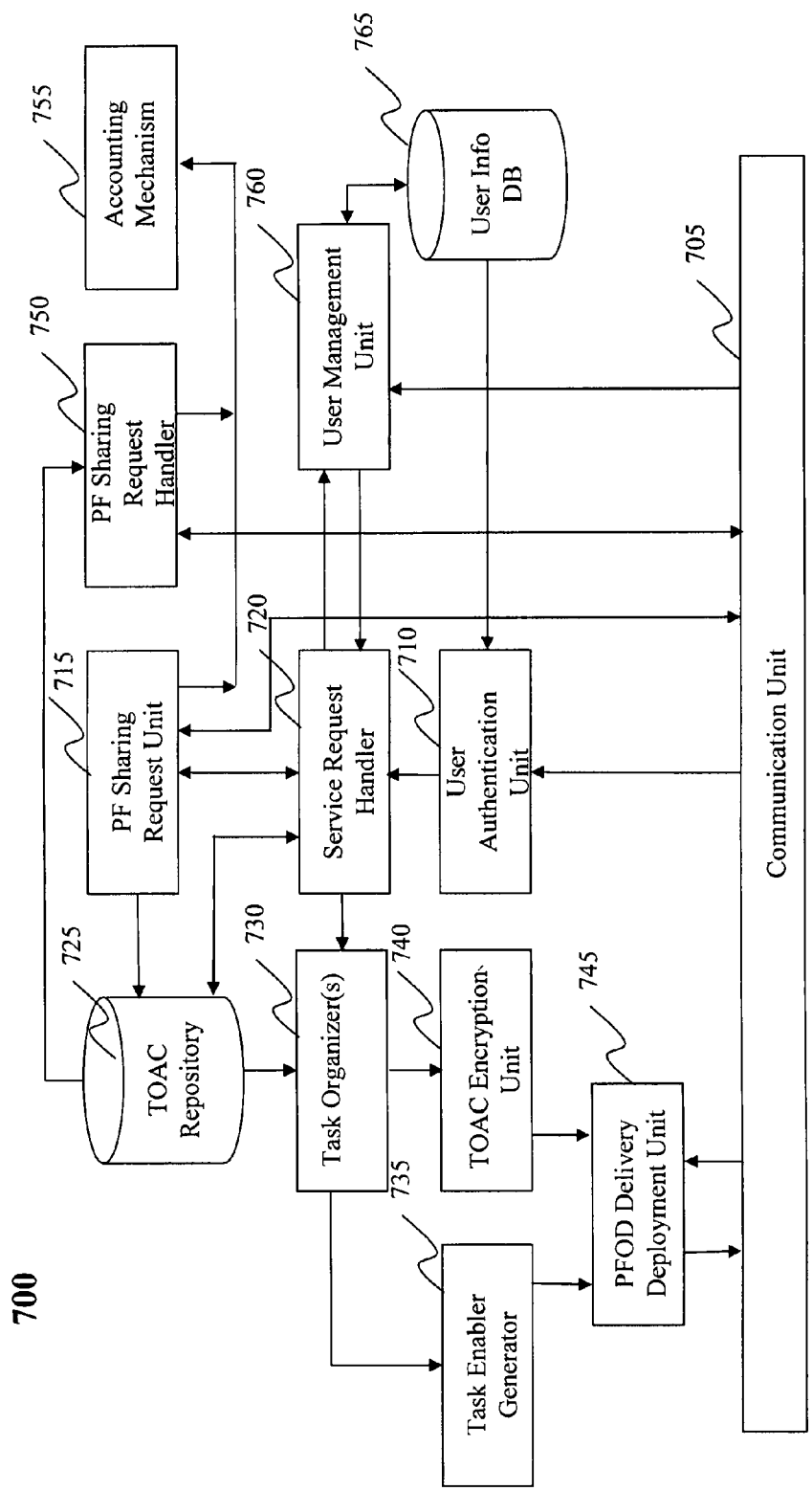
FIG. 7 depicts a block diagram of an exemplary processing function on demand service provider configured to support processing function on demand operation, according to an embodiment of the present teaching.

FIG. 7 depicts a block diagram of an exemplary PF provider system 700 configured to support processing function on demand operation, according to an embodiment of the present teaching. The exemplary PF provider system 700 comprises a communication unit 705, a user authentication unit 710, a service request handler 720, a TOAC repository 725, one or more task organizers 730, a task enabler generator 735, a TOAC encryption unit 740, and a PFOD delivery deployment unit 745. The TOAC repository 725 may be configured to host a range of processing functions that can be requested on-demand. Such processing functions may be from different applications and each may be stored with, e.g., certain types of meta information specifying various conditions under which the corresponding processing function may be utilized by a requesting user. Such meta information may also include such information as the price for each use and terms of its use such as the life span of the function or under what conditions the function is to be terminated upon use.

A TOAC is a self-contained functional component that is designated to perform a predefined task or sub-task. For example, an image processing and analysis task, such as computer-aided-detection (CAD) or computer-aided-perception (CAP), may be decomposed into one or more groups of sub-tasks, which may be correspondingly represented by one or more groups of TOACs. A TOAC may be small or light weight packaged with one or more processing functions. For instance, if a user sends an on-demand request to perform nodule detection on MRI volumetric data, one or more TOAC or TOAC groups may be accordingly accessed or invoked, e.g., from an existing repository such as the TOAC repository 725, to provide various sub-task tools that facilitate the functional operations at different stages of detecting a nodule in MRI data. Some of such functional operations may detect the presence of abnormal anatomical structure(s) such as nodules. Some functional operations may be utilized to make specific measurement of a detected nodule such as position, shape, and size. In some embodiments, the TOACs or TOAC groups corresponding to the task of detecting nodule(s) in MRI volumetric data may be packaged in a predetermined fashion according to some common usage standard. In other embodiments, the organization of the TOACs or TOAC groups may be adapted to specific users according to their operational preferences observed in the past dealings. For example, a particular physician may prefer to generate a paper report after each detection. The TOACs or TOAC groups packaged for this physician may accordingly include a reporting processing function for that purpose.

When the PF provider system 700 is configured to be able to adaptively respond to a user's request based on the user's preference or habits, the exemplary PF provider system 700 may also optionally include a user management unit 760, which may be responsible for monitoring the sequences of requests from individual users to derive behavior information for such individual users, and a user information database 765, which may store the derived individual users' preference information that can be used to adaptively handle each user's request.

The communication unit 705 is provided to perform communications between the PF provider 700 and the outside world. For example, the communication unit 705 receives a request from the outside world and returns a response to the outside world. When a PFOD request is received, the request is forwarded from the communication unit 705 to the user authentication unit 710. The user authentication unit 710 may authenticate a request and the underlying user who makes the request. The authentication process may include, but not be limited to, authentication of the user's identity, service term authentication such as quota verification.

After a service request is authenticated, the service request handler 720 may start to process a PFOD request. The service request handler 720 may perform various operations with respect to the service request. For instance, the service request handler 720 may check whether the requested processing function is available locally in the TOAC repository 725. The check may be performed against an indexing system associated with the inventory in the TOAC repository 725. This check may be useful especially when the PF provider 700 is capable of sharing processing functions with other PF providers. In some embodiments, the PF provider system 700 may handle a request asking for a processing function requested by a user even when the requested processing function is not directly available locally. To successfully respond to a user's on-demand request for such a processing function, the exemplary system 700 may further include a PF sharing request unit 715, a PF sharing request handler 750, and an accounting management unit 760.

When the requested PF is not present in the TOAC repository 725, the service request handler 720 may activate the PF sharing request unit 715 to send a request to other associated PF provider(s) via the communication unit 705. When the associated PF provider(s) respond to such a request and return the requested PF (TOACs or TOAC groups) to the PF provider 700, the communication unit 705 forwards the received PF or TOACs to the PF sharing request unit 715, which may then store the received PF/TOACs in the TOAC repository 725 in accordance with terms agreed upon between the PF provider 700 and its associated PF providers. This may be viewed as an inter-provider loan for processing functions or TOACs. The terms agreed upon may relate to the cost and duration associated with the agreed cost. Such loans may also affect the accounting of the PF provider 700. The PF sharing request unit 715 may communicate with the accounting mechanism 755 upon receiving the requested PF or TOACs.

The PF sharing request unit 715 may also forward the on-demand processing function(s) or TOAC(s) received from other service provider(s) directly to the service request handler 720 (e.g., when it is a one time loan type of arrangement) so that the service request handler 720 may then hand the on-demand processing function(s) to the task organizer(s) 730. In some embodiments, the PF sharing request unit 715 may also forward the received PF(s) or TOAC(s) directly to the task organizer(s) 730 (not shown).

The service request handler 720 may keep a record of individual users' PFOD requests and send such record to the user management unit 760. The user management unit 760 may perform analysis on each individual user's request history and derive information reflecting such user's preferences or habits. For example, user A often requests a particular group of functions comprising functions F1, F2, . . . , Fi in sequence. When user B request function F1, user B usually requests also another function F5 that has to be requested from a third party PF provider. Such personalized information derived may be stored in the user information database 765 and may be subsequently retrieved to, e.g., adaptively handle a user's request in an individualized manner. For example, such personalized information may be later utilized by the service request handler 720 or the task organizer(s) 730 (not shown) to determine which TOACs or TOAC groups to be invoked for each received PFOD request.

In the illustrated embodiment 700, the task organizer(s) 730 may organize related TOACs to perform a requested task or processing function. More than one task, e.g., different image processing and analysis tasks, may utilize the same TOACs, such as edge detection TOACs. Conversely, different tasks or intelligent image processing and analysis tasks may each have their own specific TOACs. The task organizer(s) 730 is to, for each PFOD request, generate organized TOACs that form the PFOD delivery to facilitate the request. The TOACs included in the PFOD delivery may be determined based on various factors. For instance, it may be determined based on conventional knowledge, e.g., to detecting a nodule, an edge detection TOAC is generally used to first detect the edges of the nodule. The determination may also be partly made based on, e.g., the individual preferences related to individual requesting users. For example, user A prefers to also measure the size and orientation of the nodule upon detection. Therefore, knowing user A's preference, the task organizer(s) 730 may also include one or more TOACs that can be used to make specific measurements of a nodule detected using other TOACs.

In some embodiments, the task organizer(s) 730 may select or group certain TOACs according to the received PFOD request. Such TOACs may be from the TOACs repository 725 and some may be received from third party PF suppliers. The task organizer(s) 730 may also organize the component TOACs in terms of both logical and/or exception relationships. For example, it may create a functional hierarchy, for example, a parent-child-sibling relationship, among TOACs or groups of TOACs or establish an order in which TOACs or groups of TOACs are to be executed at the requesting user's site. In some embodiments, the task organizer(s) 730 may also determine the life spans of individual TOACs in accordance with, e.g., the established order of execution. The hierarchical relationship among selected TOACs may also be re-organized by the task organizer(s) in handling a different request for performing a different task.

In the illustrated embodiment, the task organizers 730 may also activate other components, e.g., the task enabler generator 735 and the TOAC encryption unit 740, to generate different parts comprising a PFOD delivery. The TOAC encryption unit 740 may encrypt or encode the TOACs received from task organizer(s) 730. The encryption may be performed on the fly. A TOAC or a TOAC group may be encrypted in the PF provider and decrypted by a PF user's site on the fly. In this manner, TOACs may be transmitted over a network from a PF provider to a PF user in real time, without requiring a high bandwidth. The transmission of different TOACs may also be managed in a manner consistent with the logical relationship, e.g., a parent-child-sibling relationship, existed among different TOACs.

Upon arriving at a user's site, TOACs may communicate with one another, e.g., on execution status. At a user site, the logical relationship among individual tasks may change on the fly, e.g., the parent-child-sibling relationship among TOACs may be modified dynamically under certain conditions. In those situations, the life span information associated with relevant TOACs may be accordingly modified under certain conditions. For example, the life span information concerning a parent and a child TOAC may be exchanged when the parent-child relationship is reversed. The life spans of individual TOACs may then be observed and individual TOACs may self-destroy or be destroyed in accordance with those modified life spans.

In the illustrated embodiment 700, the task enabler generator 735 may be responsible for generating a task enabler based on the output of the task organizer. A task enabler may be designed to not only enable but also schedule, control, and monitor the operational status as well as the execution of TOACs or TOACs groups once it is delivered and activated at a PF user's site. As discussed with reference to FIG. 5, a PF user may, upon receiving a PFOD delivery, extract the task enabler from the PF delivery and utilize the tasks enabler to control and monitor the process of utilizing the received on-demand process functions.

After arriving at the PF user site, the task enabler may be used to enable certain functional components in the user's system. For example, it may enable the TOAC decryptor 530, the TOAC assembler 535, the TOAC execution unit 545, the TOAC life span monitor 550, and the task output assembly unit 540 in order to perform the requested task(s). The task enabler may coordinate with these components in the user's system to monitor and control the execution of the TOACs according to their schedules or status. The task enabler may also coordinate and control the sequence of execution of TOACs to ensure that the required task is completed in an appropriate order.

The tasks enabler generated by the task enabler generator 735 and the encrypted or encoded TOACs are combined by the PFOD delivery deployment unit 745. The combination forms the PFOD delivery may be deployed, by the deployment unit 745 to the PF user who makes the request then over a network connection via the communication unit 705. The deployment may be carried out in different manners, depending on the system implementation. In some embodiments, the entire PFOD delivery may be deployed or sent to a requesting user together. In some embodiments, the PFOD delivery may be sent from the PF provider to a PF user piece by piece, e.g., in a streaming fashion. When delivered in a streaming fashion, the requirement for bandwidth may be lower. In addition, when a PFOD delivery can be made gradually (e.g., streaming), the delivery itself may also be made on-demand. For example, a TOAC or a TOAC group in a PFOD delivery may be sent later to the requesting PF user when a further request is received by the deployment unit (via the communication unit) from a TOAC or a TOAC group of the same PFOD delivery that is deployed earlier to the user site. In this manner, the PFOD delivery may comprise more than what is actually deployed and what is actually deployed for each request may depend on the dynamic need of the requesting PF user. However, when a PFOD delivery is packaged in a way that anticipates what the user needs (e.g., according to the user's preference or habits) and ready to be delivered, whenever a subsequent TOAC or TOAC group is needed, it can be delivered to the user immediately and directly from the deployment unit 745, hence, much faster.

The on-demand streaming capability of the deployment unit 745 may further facilitate the ability to provide flexible deployment of dynamically demanded processing functions. In some situations, different TOACs may be exclusive of each other in operation (i.e., they will not be all performed) and which one is to be delivered to the user's site may depend on an operation performed by the user using previously delivered TOACs. For example, if activation of TOAC A will lead to the use of TOAC D but exclude the use of TOAC B and C, when a user activates TOAC A at the user site, the activated TOAC A may send a signal back to the PF provider instructing the PF provider to deliver TOAC D and eliminate the deployment of TOAC B and C. In this manner, the task organizer(s) 730 may have an inclusive organization of TOACs that encompasses all functions that potentially may be utilized by the user based on the received PFOD request. However, due to the on-demand streaming capability associated with the deployment unit 745, the PF provider delivers those TOACs that are actually needed based on the dynamics of the user operations. Therefore, having an encompassing PFOD delivery for deployment may not lead to the situation where unused TOACs are unnecessarily deployed over the network and, hence, waste bandwidth and network time.

To schedule streaming, certain conventions may be employed. For example, TOACs at a higher level of the TOAC hierarchy may be streamed first. Once these higher level TOACs are received and executed at the user site, TOACs at lower levels of the TOAC hierarchy may still be either in network transmission or yet to be transmitted on-demand.

In an actual system implementation, a PF provider system such as 700 may be configured to connect to a plurality of PF user systems via network(s) to provide on-demand processing functions. In addition, a PF provider may provide PFs of a diversified range of applications, potentially from different vendors, to meet various types of PFOD requests from users in different application fields. For example, a PF provider may support on-demand processing function deliveries in the medical imaging field, in the database management field, in the remote educational system field, etc. Furthermore, when different PFs from different vendors present differences such as platform issues, etc., the PF provider, as illustrated in the present teaching, may also provide automatic wrappers to different PFs in order to transmit PFOD deliveries that are consistent with a requesting user's platform or usage environment. Various wrappers may be automatically coupled to a PFOD delivery depending on parameters specified by a requesting user prior to the delivery.

At the PF user site, the application interface 505 may also be an application independent interface. It may provide a unified presentation of processing functions of different applications so that a PF user may freely select any PFs for the tasks at hand. When a selected PF is sent as a PFOD request, information related to the particular user's computing environment or platform parameters may be coupled with the PFOD request and sent to the PF provider. In this manner, when the PF provider delivers the PFOD package to the requesting user, the delivered PFs may be appropriately processed so that they can be utilize in a suitable manner at the PF user's site.

Figure 8:
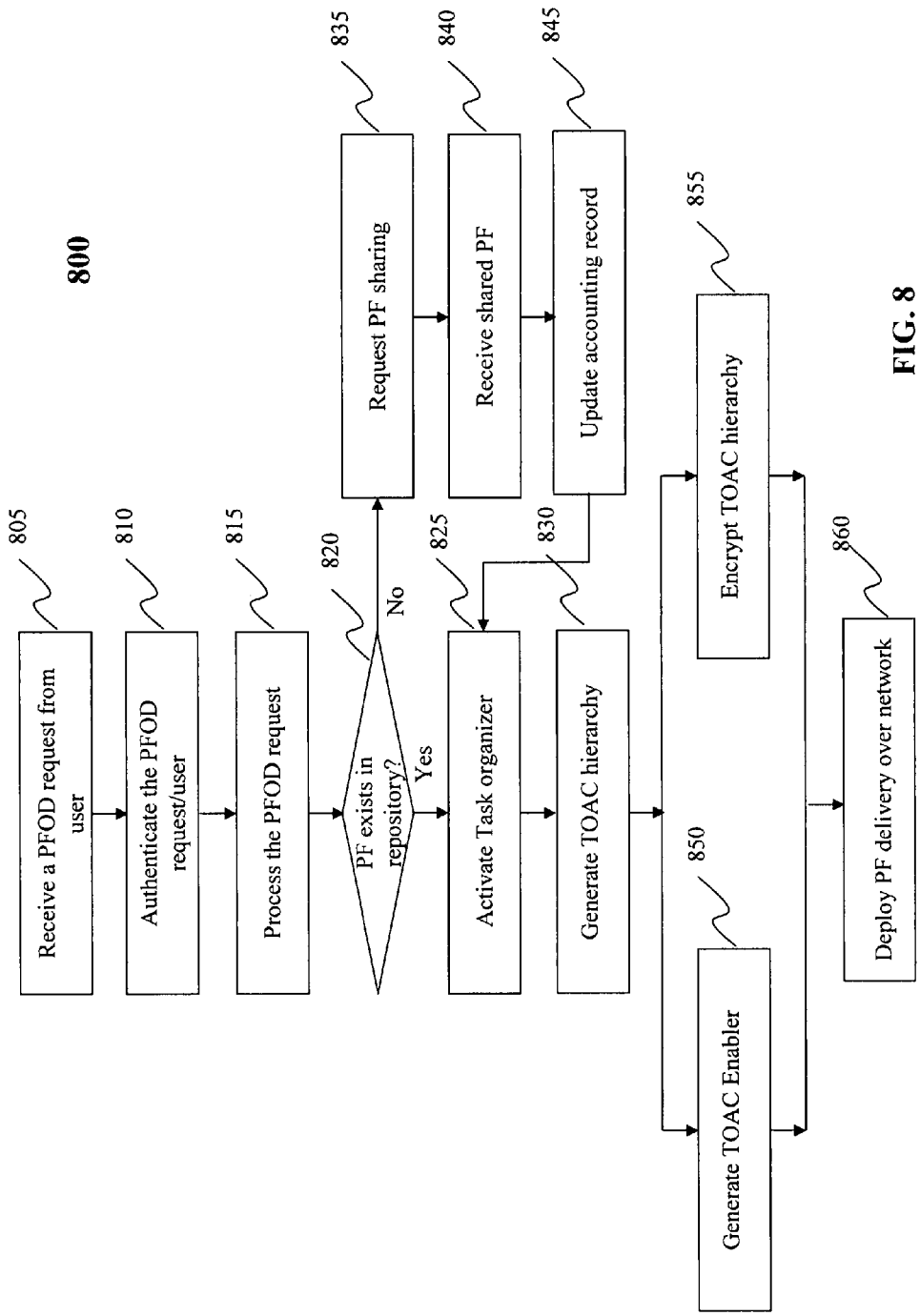
FIG. 8 is a flowchart of an exemplary process for a processing function on demand operation on a provider site, according to an embodiment of the present teaching.

FIG. 8 is a flowchart of an exemplary process of a PF provider that facilitates processing function on demand operations, according to an embodiment of the present teaching. A PFOD request is received, at 805, from a PF user. Authentication is performed, at 810, with respect to the PF user who sends the PFOD request or the PFOD request itself. Once authenticated, the PF provider processes the received PFOD request at 815, to determine, e.g., the processing function requested and other associated parameters. Such a determination may be further used to determine the processing functions or TOACs/TOAC groups needed by the requesting user based on not only the PFOD request received but also on personalized information (preferences, habits, or past behavior) associated with the requesting user. A set of one or more TOACs or TOAC groups may be determined. The PF provider may then check first, at 820, whether the TOACs needed are available from the local TOAC repository.

If at least some TOACs are not available locally, the PF provider may request shared PFs from other PF providers. To do so, the PF provider sends, at 835, a request for shared PFs. Upon receiving the requested PFs from other PF provider(s) at 840, the PF provider updates, at 845, the associated record for, e.g., inter-provider loans, for accounting purposes. The received PFs from other PF provider(s) may be stored in the local repository or forwarded to the task organizer(s).

If the requested PFs are available locally, determined at 820, the PF provider may access directly the needed PFs from a local repository to generate a PFOD delivery package. In organizing TOACs into a PFOD delivery, the task organizer(s) 730 may determine further specific TOACs to be organized into a PFOD delivery in order to appropriately respond to the user's PFOD request. As discussed, such a determination may also be made adaptively with respect to each individual user's preferences, likings, or habits by utilizing such information associated with the user stored in the user information database 765. The TOACs selected to form the PFOD delivery are organized to generate, at 830, a TOAC hierarchy. Such a hierarchy is further encrypted or encoded at 855. A task enabler is also accordingly created, at 850, with respect to the generated TOAC hierarchy. Both the task enabler and the TOAC hierarchy may be deployed, at 860, over a network connection to transmit or stream, on-demand, the TOACs included in the hierarchy to a requesting user.

Figure 9:
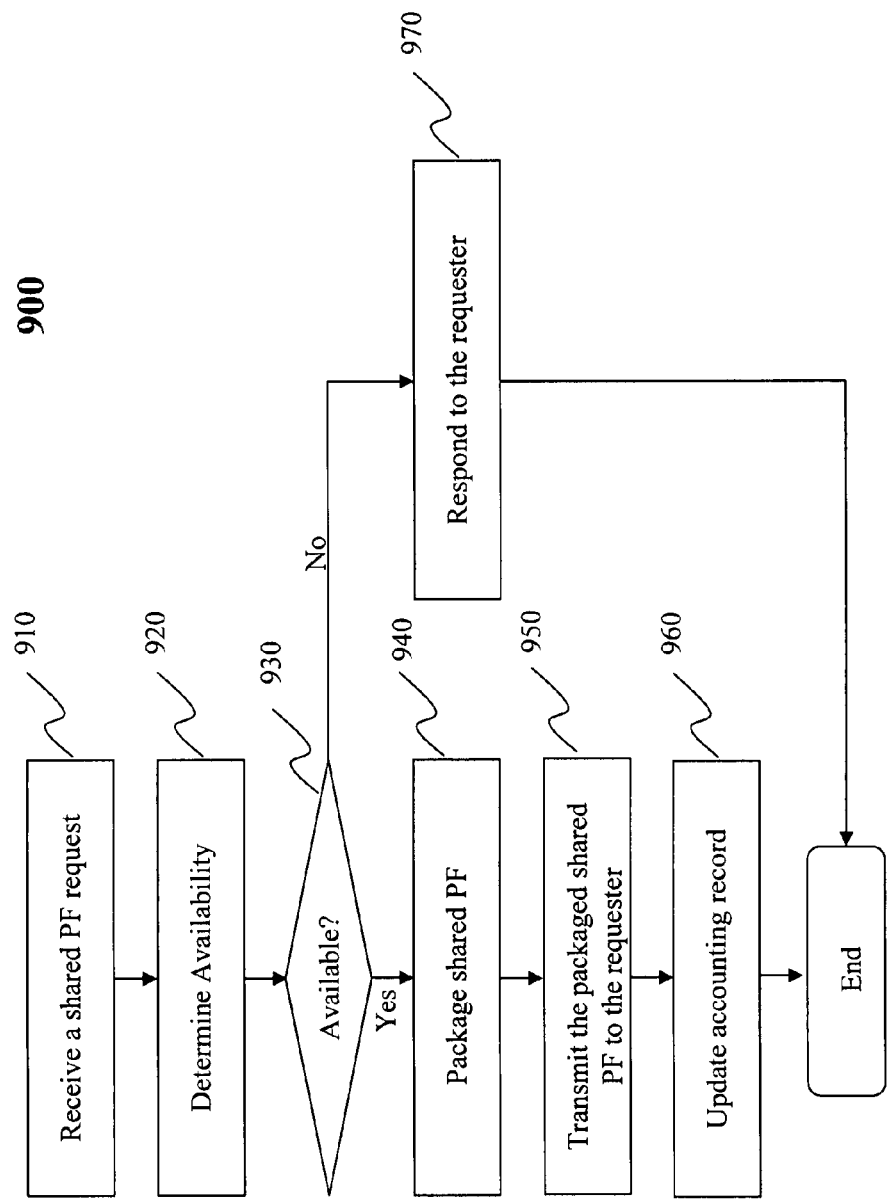
FIG. 9 is a flowchart of an exemplary process in which a processing function on-demand provider shares a processing function with another processing function on-demand provider upon request, according to an embodiment of the present teaching.

FIG. 9 is a flowchart of an exemplary process in which a PFOD provider shares a processing function with another PF provider upon request, according to an embodiment of the present teaching. This exemplary process illustrates the PF sharing in the reverse direction compared with what is disclosed in FIG. 8. When a PFOD provider receives, at 910, a sharing request for a PF, it first determines, at 920, the availability at its local repository. If the requested PF is available, determined at 930, the PFOD provider packages, at 940, the requested sharing PF at 940 and transmits the package to the requesting PF provider at 950. The accounting record at the PF provider that shares the requested PF(s) is then updated at 960. The accounting record may be updated in accordance with some agreement between the supplier and the receiving PF providers. In some embodiments, such sharing may be based on a fee and in other embodiments, the sharing may be without cost. If the requested PF is not available, the PF provider that receives the request responds, at 970, to the requesting PF provider with a negative response.

While the inventions have been described with reference to the certain illustrated embodiments, the words that have been used herein are words of description, rather than words of limitation. Changes may be made, within the purview of the appended claims, without departing from the scope and spirit of the invention in its aspects. Although the inventions have been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

We claim:

1. A method, comprising:
    initiating a user interface at a user site;
    receiving a selection of a processing function of an application via the user interface;
    transmitting a processing function on-demand (PFOD) request via a network connection to request the selected processing function;
    receiving a processing function on-demand (PFOD) delivery including the selected processing function sent as a response to the PFOD request;
    extracting from the received PFOD delivery the one or more encoded task oriented analytic components (TOACs);
    decoding the TOACs to derive one or more component functions of the application, where the one or more component functions includes the selected processing function; and
    executing the selected processing function at the user site.

2. The method of claim 1, wherein the user interface is a graphical user interface.

3. The method of claim 2, wherein the selection of the processing function requested via the network is made through the graphical user interface.

4. The method of claim 1, wherein the network is at least one of:
    the Internet;
    an intranet;
    a wireless network;
    a virtual network;
    a PTSN; and
    a proprietary network.

5. The method of claim 1, further comprising automatically terminating the processing function after the executing of the processing function.

6. The method of claim 5, wherein the terminating is performed after a certain duration in time starting from one of:
    the receiving the PFOD delivery including the selected processing function; and
    the executing the selected processing function.

7. The method of claim 1, further comprising:
    responding to the PFOD request; and
    sending the PFOD delivery to the user site.

8. The method of claim 7, wherein a service provider responds to the PFOD request and provides, as a service, the PFOD delivery to the user site.

9. The method of claim 7, wherein a peer responds to the PFOD request and provides the PFOD delivery to the user site.

10. The method of claim 1, wherein the one or more TOACs associated with the PFOD delivery are sent from the service provider to the user site in a streaming manner on demand based on a request.

11. The method of claim 10, wherein a second TOAC streamed to the user site is sent based on a demand from a first TOAC streamed previously to the user site.

12. The method of claim 11, further comprising
extracting a task enabler from the received PFOD delivery; and
assembling the one or more component functions in accordance with the task enabler,
wherein the task enabler is configured for enabling the one or more component functions included in the TOACs.

13. The method of claim 1, wherein the PFOD delivery comprises one or more groups of TOACs.

14. A method, comprising:
receiving, from a user site via a network connection, a processing function on-demand (PFOD) request that requests a processing function associated with an application;
responding to the PFOD request to provide a processing function on-demand (PFOD) delivery having the selected processing function included therein, where the PFOD delivery is organized as one or more task oriented analytical components (TOACs) identified based on the PFOD request; and
sending the PFOD delivery to the user site, wherein
the requested processing function is identified via a user interface associated with the application deployed at the user site.

15. The method of claim 14, wherein the identification of the processing function requested via the network is made through a graphical user interface deployed at the user site.

16. The method of claim 14, wherein the network is at least one of:
the Internet;
an intranet;
a wireless network;
a virtual network;
a PTSN; and
a proprietary network.

17. The method of claim 14, wherein the one or more TOACs are identified by:
determining the one or more TOACs based on the PFOD request; and
locating the one or more TOACs.

18. The method of claim 17, wherein the determining is performed based on at least one of:
relationship among the one or more TOACs;
relationship between the one or more TOACs and the selected processing function; and
individualized information of a user who makes the PFOD request.

19. The method of claim 17, wherein the locating comprises:
examining the availability of the one or more TOACs;
sending a request for a shared processing function for each of the one or more TOACs that is not available;
receiving a shared processing function sent as a response to the request for a shared processing function.

20. The method of claim 14, wherein the PFODs are organized by:
encoding the one or more TOACs identified; and
creating an TOAC enabler in accordance with the one or more TOACs.

21. The method of claim 14, wherein the sending of the PFOD delivery is carried out in an on-demand streaming fashion.

22. The method of claim 21, wherein the on-demand streaming of a second TOAC of the PFOD delivery is based on a demand initiated by a first TOAC of the PFOD delivery that is previously streamed to the user site.

23. The method of claim 14, further comprising utilizing the processing function at the user site.

24. The method of claim 23, further comprising automatically terminating the one or more TOACs and the processing function of the application after the utilizing of the processing function at the user site.

25. The method of claim 24, wherein the terminating is performed after a certain duration in time starting from one of:
receiving, at the user site, the PFOD delivery including the processing function; and
utilizing the processing function at the user site.

26. The method of claim 25, wherein the utilizing comprises:
extracting from the received PFOD delivery the one or more TOACs;
decoding the one or more TOACs to derive one or more component functions of the application; and
executing the selected processing function,
wherein the one or more component functions include the selected processing function.

27. The method of claim 26, further comprising:
extracting a task enabler from the received PFOD delivery; and
assembling, in the application interface, the one or more component functions in accordance with the task enabler,
wherein the task enabler is configured for enabling the one or more component functions included in the TOACs.

28. A system, comprising:
a user interface configured for interacting with a user and receiving a selection of a processing function of an application at a user site;
a communication unit configured for transmitting a processing function on-demand (PFOD) request via a network connection to request the selected processing function and receiving a PFOD delivery sent in response to the PFOD request;
an enabling unit coupled to the communication unit to extract an task enabler from the received PFOD delivery;
a decryptor coupled to the communication unit to decode one or more task oriented analytic components (TOACs) included in the PFOD delivery to derive at least one component function;
an assembler coupled to the enabling unit and the decryptor to assemble the decoded at least one component function in accordance with the task enabler; and
an execution unit coupled to the assembler and the enabling unit for executing the selected processing function,
wherein the at least one component function includes the selected processing function.

29. The system of claim 28, further comprising a life span monitor coupled to the execution unit and the enabling unit to monitor the life span of the processing function and to automatically terminate the processing function based on a predetermined criterion.

30. A system, comprising:
- a communication unit connected to a network to receive, via the network, a processing function on-demand (PFOD) request from a user site that requests a processing function associated with an application and send a PFOD delivery;
- a TOAC identifier coupled to a task oriented analytic component (TOAC) repository to locate one or more TOACs based on the PFOD request;
- a delivery generation unit coupled to the TOAC identifier and the TOAC repository to organize the identified one or more TOACs to generate the PFOD delivery; and
- a PFOD delivery deployment unit coupled to the request responding unit to send the PFOD delivery to the user site, wherein the requested processing function is identified via a user interface deployed at the user site.

31. The system of claim 30, wherein the TOAC identifier comprises:
- an authentication unit coupled to the communication unit to authenticate the PFOD request; and
- a request handler coupled to the authentication unit and the TOAC repository to check the availability of the one or more TOACs.

32. The system of claim 30, wherein the TOAC identifier further comprises a processing function (PF) sharing unit coupled to the request handler and the communication unit to share a processing function via the network.

33. The system of claim 30, wherein the delivery generation unit comprises:
- an encryptor configured to encrypt the one or more TOACs; and
- a task enabler generator configured to generate a task enabler in accordance with the PFOD request to enable the one or more TOACs.

* * * * *